United States Patent [19]

Tsujino

[11] Patent Number: 5,046,169
[45] Date of Patent: Sep. 3, 1991

[54] MAGNETIC TAPE CASSETTE LOADING AND GUIDING SYSTEM

[75] Inventor: Yukihiko Tsujino, Tokyo, Japan

[73] Assignee: Sony Corporation, Tokyo, Japan

[21] Appl. No.: 448,991

[22] Filed: Dec. 12, 1989

[30] Foreign Application Priority Data

Dec. 20, 1988 [JP] Japan .................................. 63-321418
Dec. 20, 1988 [JP] Japan .................................. 63-321419

[51] Int. Cl.⁵ .......................................... G11B 15/675
[52] U.S. Cl. ...................................... 360/96.5; 360/94
[58] Field of Search ................................ 360/96.5, 94

[56] References Cited

U.S. PATENT DOCUMENTS

| | | | |
|---|---|---|---|
| 4,786,996 | 11/1988 | Ohtani et al. | 360/94 |
| 4,791,509 | 12/1988 | Rademacher | 360/94 |
| 4,878,138 | 10/1989 | Ando et al. | 360/96.5 |
| 4,918,550 | 4/1990 | Baranski | 360/94 |

*Primary Examiner*—Robert S. Tupper
*Attorney, Agent, or Firm*—Ronald P. Kananen

[57] ABSTRACT

A magnetic tape cassette loading system for a recording and/or reproducing apparatus, includes a cassette holder assembly for receiving and holding one cassette of any of a number of different sizes. The cassette holder assembly includes an outer cassette holder which is movable within the loading system body in the vertical and horizontal directions, and an inner cassette holder which supports a cassette therein and which is so supported on the outer cassette holder as to be movable thereon in the horizontal direction. The inner and outer cassette holders are cooperable to cause a cassette to move to an eject position, in which a cassette can be received into the cassette holder assembly and removed therefrom, and a loaded position in which cassette loading is completed. The cassette loading system also includes a cassette guiding mechanism for guiding a cassette to the cassette holder assembly so as to position the cassette in the cassette holder assembly at a predetermined position adapted to each of the different sized cassettes. The cassette guiding mechanism includes stopper members which prevent a cassette from being received and held in the cassette holder assembly at a position other than the predetermined position and/or from being obliquely introduced into the cassette holder assembly.

10 Claims, 8 Drawing Sheets

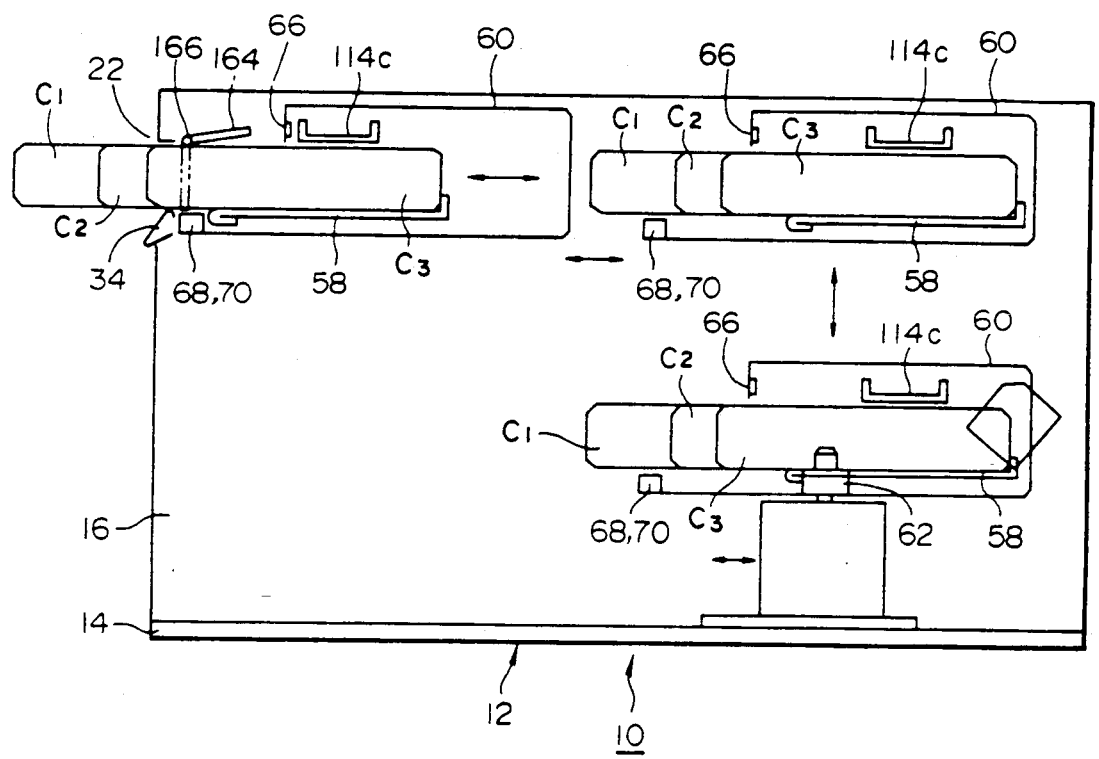
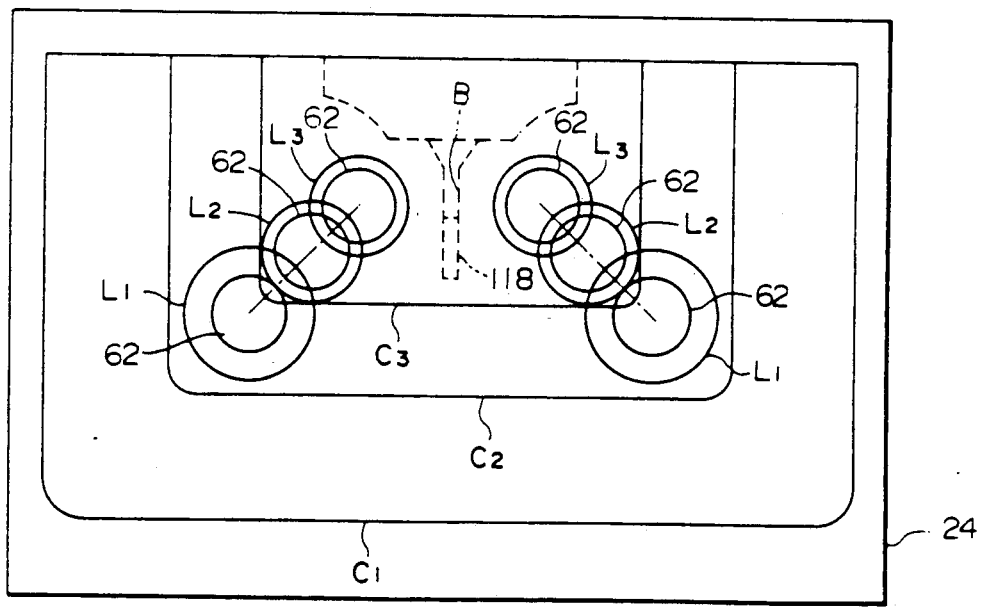

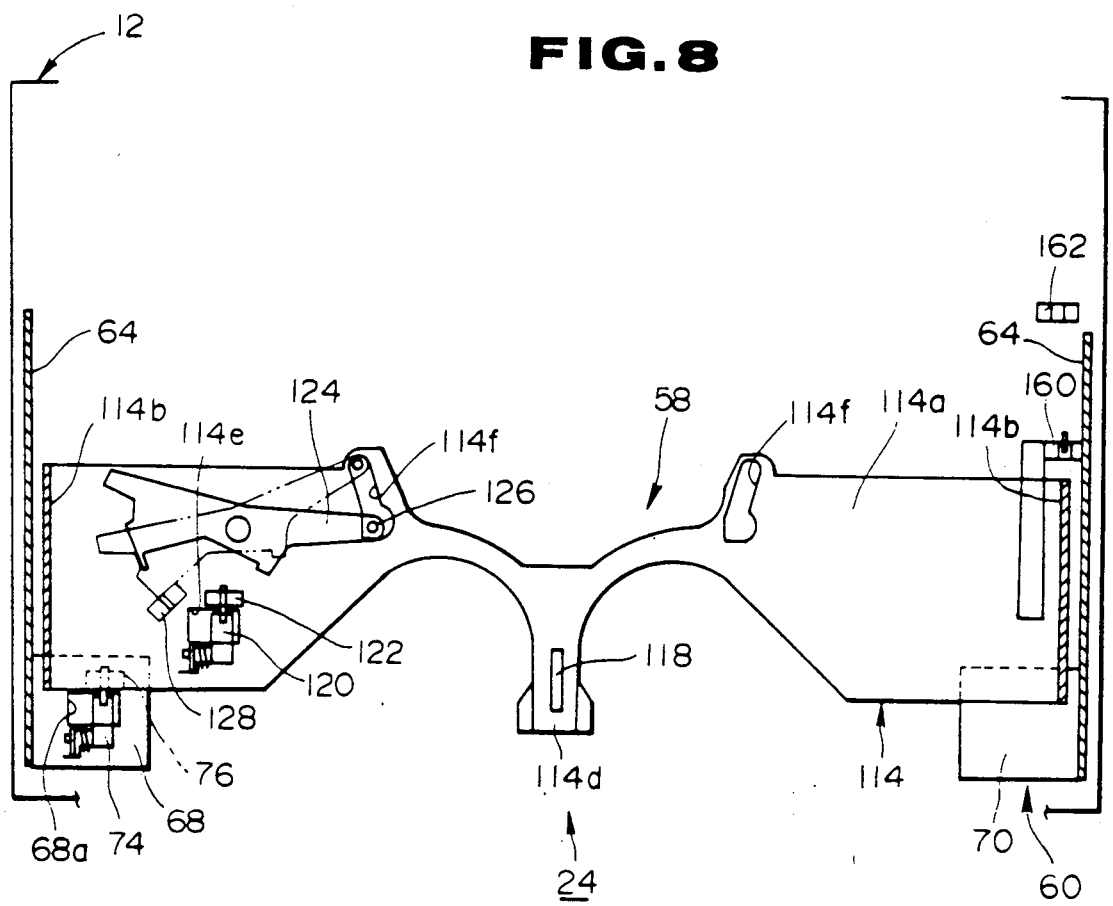

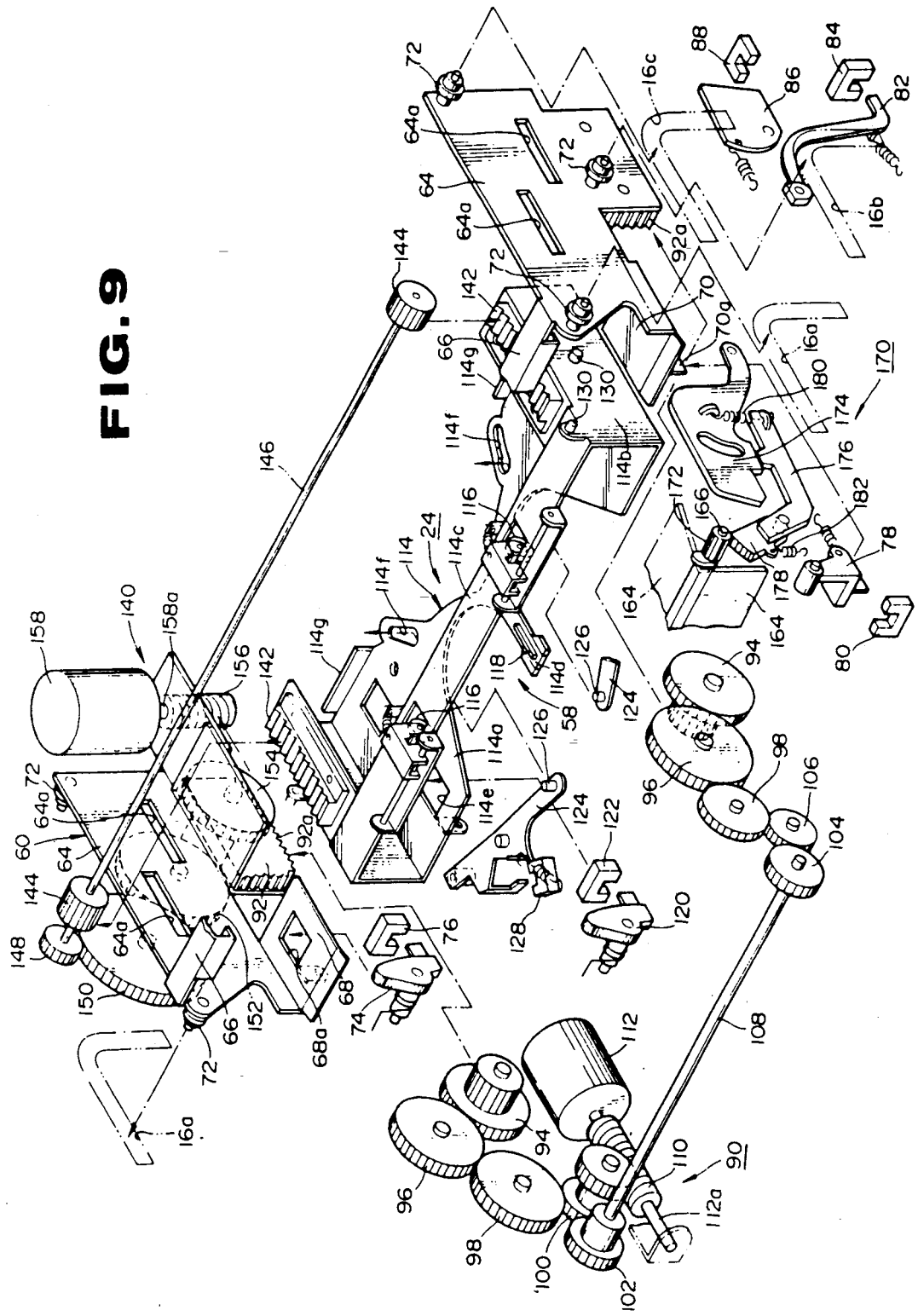

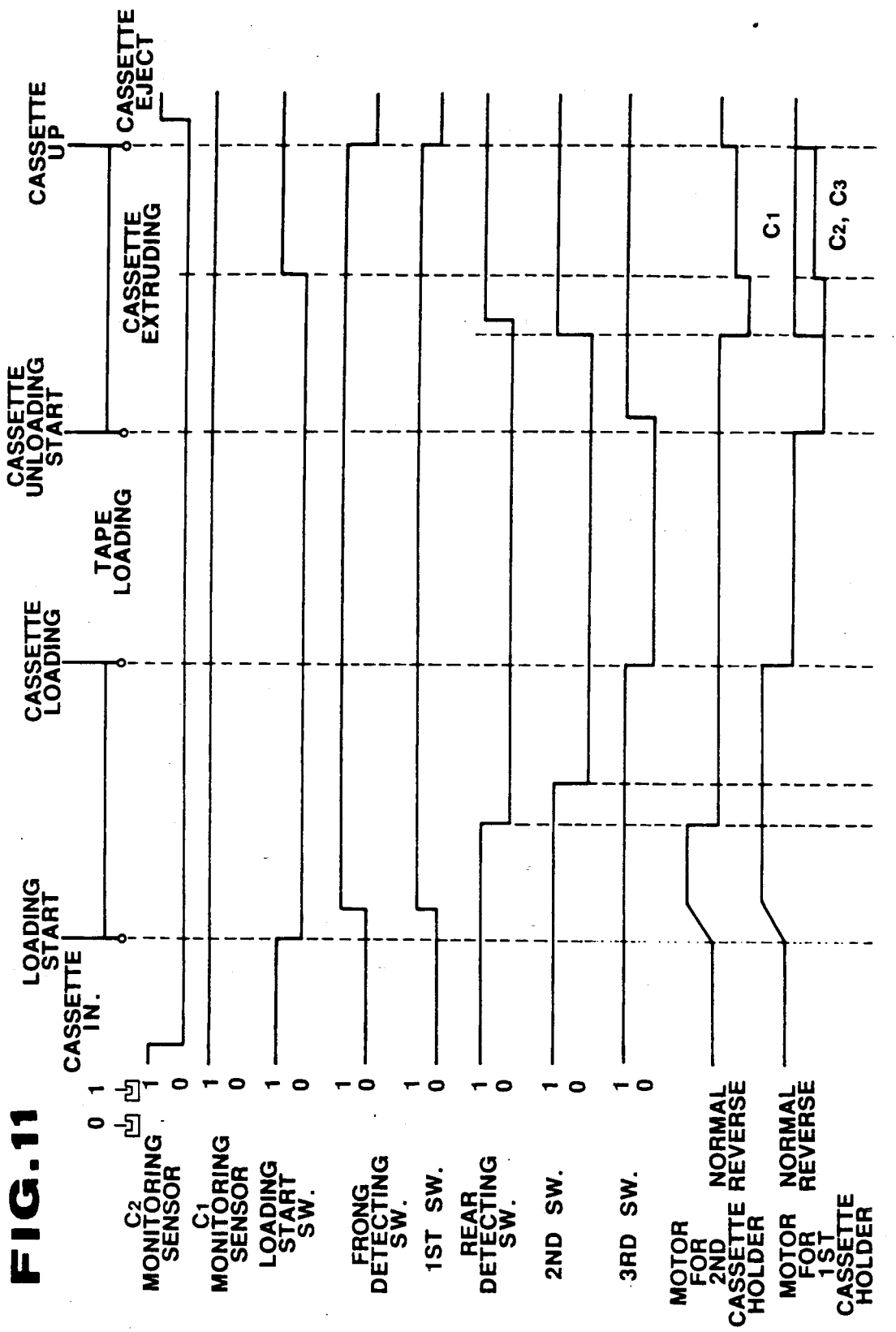

MAGNETIC TAPE CASSETTE LOADING AND GUIDING SYSTEM

BACKGROUND OF THE INVENTION

1. Field of the Invention

The present invention relates generally to a magnetic tape cassette loading system in a recording and/or reproducing apparatus, such as a front-loading type video tape recorder (VTR). More specifically, the invention relates to a magnetic tape cassette loading system which can selectively load tape cassettes of three different sizes, i.e. a large, medium or small cassettes.

2. Description of the Prior Art

One such magnetic tape cassette loading system is disclosed in Japanese Patent First (unexamined) Publication (Tokkai Sho.) No. 60-76049. This loading system has a cassette holder which holds therein a tape cassette of one of three different sizes. After the cassette has been introduced into the cassette holder, the cassette holder moves rearward in a horizontal direction, and then downwards in a vertical direction for transporting the cassette to a predetermined position. Since a pair of reel shafts of the loading system must assume different positions as the size of an introduced cassette changes, this loading system has three sensors which monitor the introduced cassette in order to determine which size cassette has been introduced into the cassette holder.

According to this loading system, a depth is provided so as to receive a small cassette, but any of three different sized cassettes can be set in the cassette holder according to a predetermined operation explained in the user's manual. However, the cassette holder must move by a relatively long distance in the horizontal direction, in order to transport the cassette to the predetermined loading position. As a result, there is a disadvantage in that a relatively long time must be sent in order to load or unload a tape cassette from the loading system.

In addition, according to this loading system, it is determined which size of cassette has been introduced into the cassette holder, on the basis of the frontal width of the introduced cassette when in loading position. Therefore, it is not possible to prevent a user from setting a small cassette in the cassette holder at a position other than the predetermined optimal loading position, or from inserting the latter obliquely. This may lead to jamming of the mechanism or damage to the VTR, the cassette, or both.

SUMMARY OF THE INVENTION

It is therefore a principal object of the present invention to eliminate the aforementioned disadvantages and to provide a magnetic tape cassette loading system in a recording and/or reproducing apparatus, which can decrease the time required for the loading and unloading of tape cassettes, as compared with prior art systems.

Another object of the present invention is to provide a magnetic tape cassette loading system in a recording and/or reproducing apparatus, which can prevent a small cassette from being introduced into a cassette holder in an incorrect manner.

In order to accomplish the aforementioned and other objects, the magnetic tape cassette loading system in a recording and/or reproducing apparatus, according to the present invention includes, cassette holding means for receiving and holding a cassette therein, which comprises inner and outer cassette holders. The outer cassette holder is movable within the loading system body in the vertical and horizontal directions, and the inner cassette holder is movable within the outer cassette holder in the horizontal direction. The inner and outer cassette holders are cooperable to cause a cassette to move between an eject position, in which the cassette can be received into and removed from the cassette holding means, and a loaded position in which cassette loading is completed. The cassette loading system may include cassette guiding means for guiding a cassette to the cassette holding means so as to position the cassette in a predetermined position in the cassette holding means, adapted for each different size of cassette, the cassette guiding means including stopper means for preventing the cassette from being received and held in the cassette holding means in a position other than the predetermined position, and/or from being obliquely introduced into the cassette holding means.

According to one aspect of the present invention, the cassette loading system comprises:

a loading system body defining a space; and cassette holding means for receiving and holding a cassette therein, the cassette holding means including a first cassette holder which is movable within the space defined by the loading system body in vertical and horizontal directions and, a second cassette: holder which supports the cassette therein and which is so supported on the first cassette holder as to be movable thereon in a horizontal direction, the first and second cassette holders being cooperable to cause a cassette to move to an ejected position, in which a cassette can be received into the cassette holding means and removed therefrom, and a loaded position in which cassette loading is completed.

The cassette loading system may further comprise first guiding means for guiding the first cassette holder in the vertical and horizontal movements thereof, and second guiding means for guiding the second cassette holder of the horizontal movements thereof. The loading system body and the first cassette holder may have respectively a pair of side walls facing each other, the first guiding means may comprise at least one pair of L-shaped guide grooves which are formed in the loading system body, and at least one pair of rollers which are pivotably supported on the side walls of the first cassette holder and which are engageable with and movable along said L-shaped guide grooves. The second guiding means may comprise at least one pair of elongated grooves, each of which extends in a horizontal direction and is formed on the side wall of the first cassette holder, and at least one pair of rollers which are pivotably supported on the second cassette holder and which are engageable with and movable along the elongated grooves. The cassette holding means may receive and hold therein one cassette of any of a plurality of different sizes.

According to another aspect of the present invention, the cassette loading system comprise:

a loading system body defining a space;

cassette holding means, arranged within the space defined by the loading system body, for receiving and holding therein one cassette of any of a plurality of different sizes; and cassette guiding means for guiding the cassette to the cassette holding means so as to position the cassette in the cassette holding means in a predetermined position adapted to each size of cassette, the cassette guiding means including stopper means for preventing the cassette from being received and held in the cassette holding means in a position other than the predetermined position, and/or from being obliquely introduced into the cassette holding means.

The cassette guiding means may comprise a pair of guide members and a pair of stopper members, each of which is pivotably supported on a shaft fixed to the loading system body, the stopper members being associated with the guide members to allow a cassette to be received and held in the cassette holding means when the introduced cassette causes both of the guide members to rotate about the shaft. The guide members may be respectively arranged at right and left sides of the loading system body, and the stopper members may be respectively arranged at right and left sides of the loading system, the stopper member arranged at the right side being connected to the guide member arranged at the left side so as to be rotatable depending upon the rotation of the guide member arranged at the left side, and the stopper member arranged at the left side being connected to the guide member arranged at the right side so as to the rotatable depending upon the rotation of the guide member arranged at the right side.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to a specific embodiment, but are for explanation and understanding only.

In the drawings:

FIG. 6 is a schematic view illustrating the movement of the cassette holder mechanism;

FIG. 7 is a schematic view illustrating the relationship between magnetic tape cassettes of different sizes and the movement of the reel shafts;

FIG. 8 is a schematic plan view of the cassette holder assembly of the cassette loading system of FIG. 1;

FIG. 9 is an exploded view of the main portion of the cassette loading system of FIG. 1;

FIG. 11 is a graph illustrating waveform characteristics of various sensors, switches and driving motors in a case where an M-cassette is introduced into the cassette holder assembly of the cassette loading system of FIG. 1.

DESCRIPTION OF THE PREFERRED EMBODIMENT

A magnetic tape cassette loading system in a recording and/or reproducing apparatus, according to the present invention, will be described herebelow in terms of the preferred embodiments in order to facilitate a better understanding of the present invention. The magnetic tape cassette recording and/or reproducing apparatus for which the loading system of the preferred embodiment will be described is designed to record and reproduce a novel, recently proposed magnetic tape cassette specifically designed for PCM audio recording and/or reproduction. However, the present invention will be applicable not only to that specific PCM audio recording magnetic tape cassette but also any magnetic tape cassettes which have the same or similar cassette structures.

Because of the rather complicated structures of the preferred embodiments the following disclosure will be in terms of separate groups of components.

Schematic Construction of System Body

Figure 1:
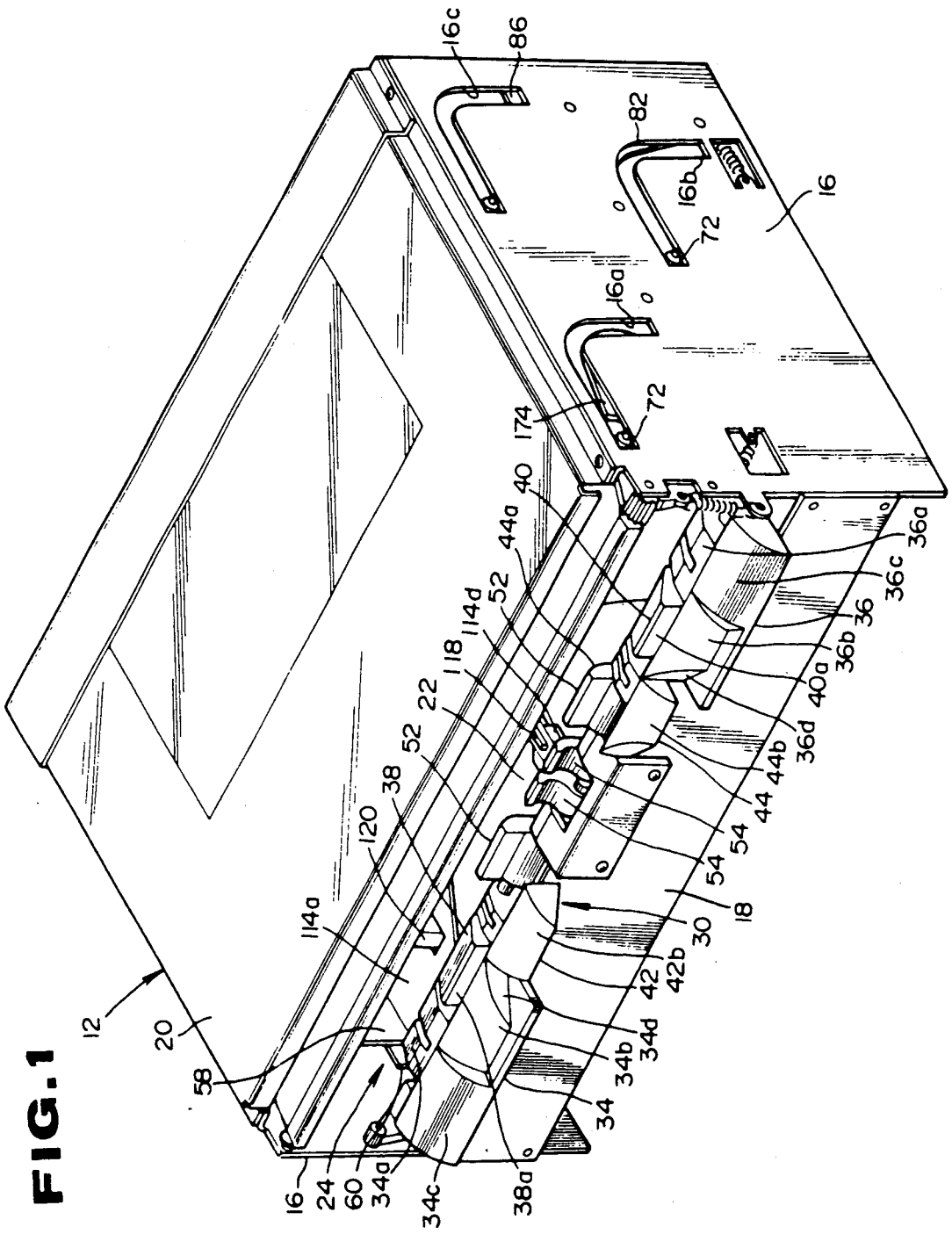
FIG. 1 is a perspective view of a cassette loading system according to the present invention.

FIG. 1 shows a magnetic tape cassette loading system 10 which can be applied to a front-loading type video tape recorder. The magnetic tape cassette loading system 10 has a box-shaped body 12. The body 12 is composed of an essentially rectangular mechanical chassis 14, a pair of essentially rectangular side plates 16 which extend vertically from both side edges of the mechanical chassis 14 and are fixed thereto, an essentially rectangular front plate 18 which is arranged between the front edges of the side plates 16 and is fixed thereto, and an essentially rectangular upper plate 20 which is arranged between the upper edges of the side plates 16 and is fixed thereto.

Each of the side plates 16 of the body 12 has essentially L-shaped three guide grooves 16a, 16b and 16c at predetermined positions so that the respective guide grooves formed in one of side plates 16 face the respective guide grooves formed in the other side plate 16. Each of the guide grooves 16a, 16b and 16c comprises a horizontally extending portion and a vertically extending portion. The front plate 18 has a cassette inlet 22 for receiving or extracting a magnetic tape cassette of any of a plurality of different sizes, i.e. large, medium or small. These large, medium and small magnetic tape cassettes will be respectively referred hereinafter to as "L-cassette Cl", "M-cassette C2" and "S-cassette C3", and a general name "cassette C" which includes all of these cassette sizes. After the cassette C is introduced through the cassette inlet 22, it is held within a cassette holder assembly 24 which can be arranged at a location near the cassette inlet 22 of the body 12.

Structure of Cassette Guide Mechanism

Figure 2:
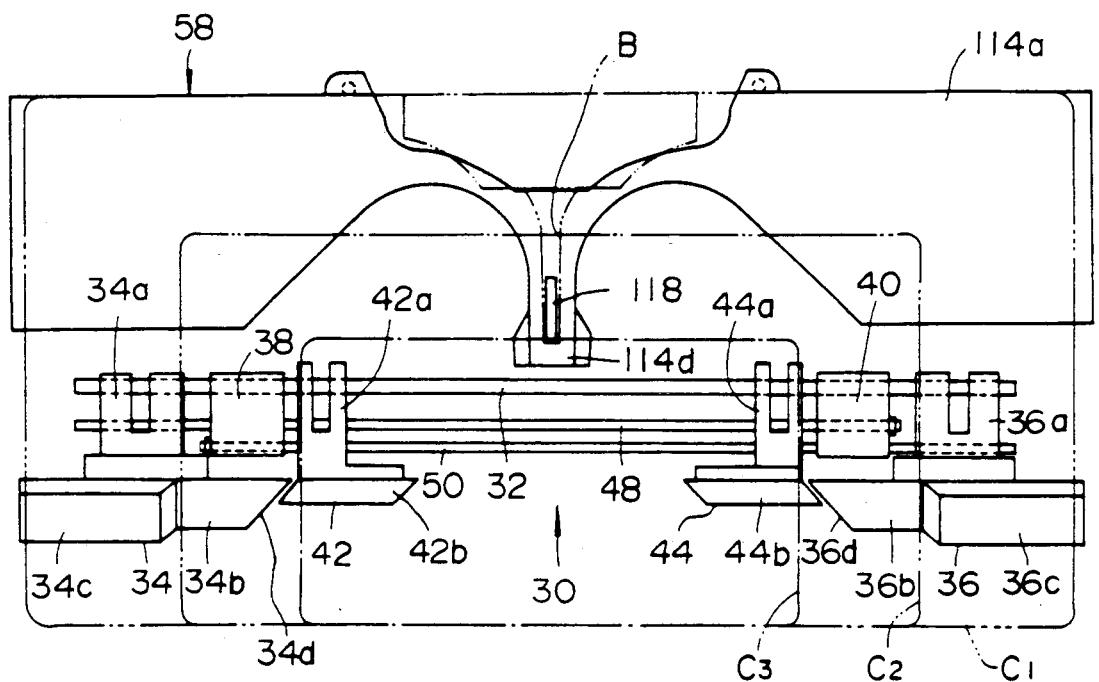
FIG. 2 is a schematic plan view illustrating a cassette guide mechanism of the cassette loading system of FIG. 1.

The cassette C is guided to the cassette holder assembly 24 by means of a cassette guide mechanism 30 which is arranged on the lower portion of the cassette inlet 22. The cassette guide mechanism 30 can guide one of an L-cassette C1, an M-cassette C2 or an S-cassette C3. As shown in FIG. 2, the cassette guide mechanism 30 comprises a supporting shaft 32, a pair of guide members 34 and 36, a pair of stopper members 38 and 40, and a pair of guide members 42 and 44. The supporting shaft 32 is arranged between the side plates 16 and extends in a lateral direction. The guide members 34, 36, 42 and 44, and the stopper members 38 and 40 are pivotably supported on the supporting shaft 32.

Figure 3:
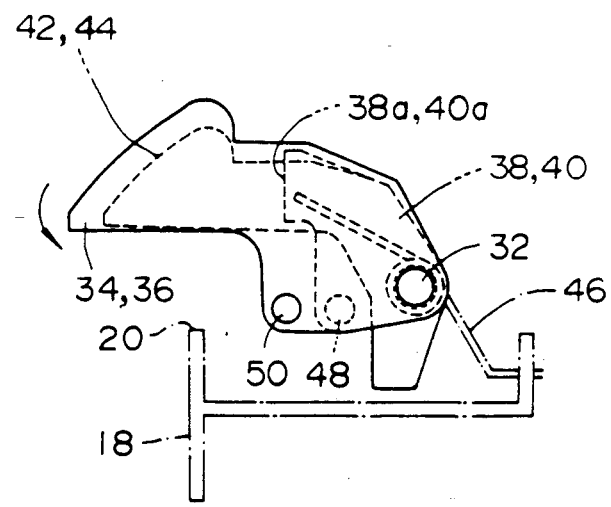
FIG. 3 is a side view of the cassette guide mechanism of FIG. 2.

The guide members 34 and 36 are made of a synthetic resin. The guide members 34 and 36 have respectively; supporting portions 34a and 36a, curved M-cassette guide surfaces 34b and 36b, L-cassette guide surfaces 34c and 36c, and tapered S-cassette guide surfaces 34d and 36d. As shown in FIG. 3, each of the guide members 34 and 36 are biased, by means of a torsion spring 46, so as to be held horizontally. When the guide members 34 and 36 are depressed by means of an L-cassette C1 or an M-cassette C2 being introduced into the cassette inlet 22, they can rotate downwards around the supporting shaft 32.

Figure 4:
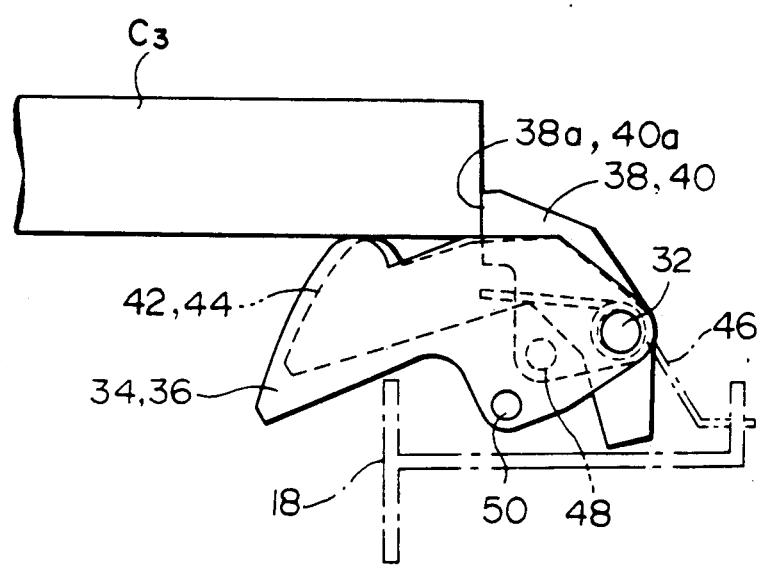
FIG. 4 is a side view of the cassette guide mechanism of FIG. 2, in a case where the cassette guide mechanism prevents an S-cassette from being introduced into the cassette holder assembly in an incorrect manner.
Figure 5:
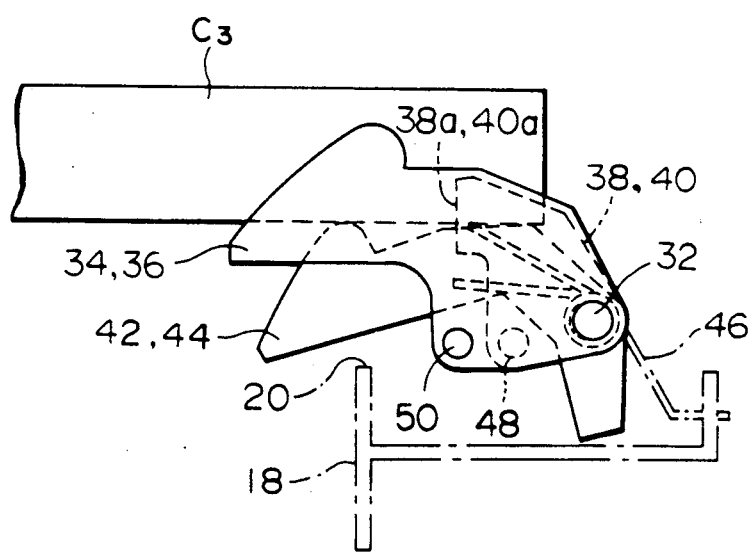
FIG. 5 is a side view of the cassette guide mechanism of FIG. 2, in a case where the cassette guide mechanism guides a S-cassette to the cassette holder assembly.

The stopper members 38 and 40 are also made of a synthetic resin, and are arranged behind the M-cassette guide surfaces 34b and 36b of the guide members 34 and 36, respectively. The stopper members 38 and 40 have respectively front surfaces 38a and 40a serving as a stopper surface. The stopper member 40 arranged on the right side in FIG. 2 is connected to the guide member 34 arranged on the left side, by means of a connecting rod 48. The stopper member 38 arranged on the left side in FIG. 2 is connected to the guide member 36 arranged on the right side, by means of a connecting rod 50. Therefore, the right stopper member 40, together with t[e left guide member 34, can rotate around the supporting shaft 32, and the left stopper member 38, together with the right guide member 36, can rotate around the supporting shaft 32. As a result, if only one of the guide members 34 or 36 is depressed or rotates downwards, the corresponding one of the stopper members 38 or 4( also rotates downwards. Therefore, for example, if a user tries to insert an S-cassette C3 through the cassette inlet 22 at a position other than the predetermined position, or to insert the latter obliquely, then, as can be seen clearly from FIG. 4, the S-cassette C3 is prevented from being introduced into the cassette holder assembly 24 by means of one of the stopper members 38 or 40, since only one stopper member 38 or 40 rotates downwards and the other stopper member 38 or 40 projects upwards when one cf the guide members 34 or 36 is depressed. In this way, it is possible that S-cassette C3 is prevented from being introduced into the cassette holder assembly 24 in an incorrect manner. On the other hand, if the user inserts an S-cassette C3 at the predetermined position in the correct manner, the S-cassette C3 is guided to the cassette holder assembly 24 smoothly, as shown in FIG. 5.

The S-cassette guide members 42 and 44 are also made of synthetic resin. The S-cassette guide members 42 and 44 have respective supporting portions 42a and 44a, as well as respective S-cassette guide surfaces 42b and 44b. As shown in FIG. 1, a pair of auxiliary guide members 52 and a pair of smaller auxiliary guide members 54 are arranged between the S-cassette guide members 42, and are pivotably supported on the supporting shaft 32. These auxiliary guide members 52 and 54 are biased by means of springs (not shown) so as to usually project upwards. When the smaller auxiliary guide members 54 are pushed forward by means of an end portion 114d of a second cassette holder 58, which will be described hereinafter, all of the auxiliary guide members 52 and 54 are designed to fall forward.

Structures of First Cassette Holder and Its Driving Mechanism

As shown in FIG. 6, the cassette holder assembly 24 comprises a first cassette holder 60 and a second cassette holder 58. The first cassette holder 60 can move vertically and horizontally along the L-shaped guide grooves 16a, 16b and 16c of the side plates 16 of the body 12, so that it can engage or disengage a cassette C from a pair of reel shafts 62 (shown in FIG. 7) which are mounted on the mechanical chassis 14. As will be described hereinafter, the reel shafts 62 can be positioned at positions L1, L2 and L3 at which the L-cassette Cl, cassette C2 and S-cassette C3 can respectively be loaded. The second cassette holder 58 can hold a cassette C (Cl, C2 or C3) thereon, and can move in a horizontal direction within the first cassette holder 60.

As can be seen clearly from FIGS. 8 and 9, the first cassette older 60 comprises a pair of outer panels 64 and a connecting panel 66 for connecting the outer panels 64 to each other. The connecting panel 66 has an essentially U-shaped cross-section, and extends perpendicularly between the outer panels 64 for connecting same. The outer panels 64 have L-cassette pedestals 68 and 70, respectively. These cassette pedestals 68 and 70 are so arranged as to project inwardly in a horizontal direction at a front portion of the outer panels 64 by being formed integrally with the outer panels 64 and being bent inwardly from the lower edges thereof. Each of the outer panels 64 is also provided with three guide rollers 72 which are rotatably supported on the outer surface of the outer panel 64 and which can move on the guide grooves 16a, 16b and 16c of the side panels 16, as shown in FIG. 1. The L-cassette pedestals 68, arranged on the left side in FIG. 8, has an essentially rectangular through opening 68a. In order to detect an L-cassette introduced into the first cassette holder 60, a detecting lever 74 is pivotably supported on the inner wall of the cuter panel 64 at a location beneath the through opening 68a. The free end of the detecting lever 74 projects upwards to pass through the through opening 68a. In addition, a sensor 76 is arranged in the neighborhood cf the detecting lever 74. The sensor monitors whetter or not an L-cassette Cl has been introduced into the first cassette holder 60. When an L-cassette Cl is introduced into the first cassette holder 60, the detecting lever 74 rotates to cause the sensor 76 to determine that an L-cassette Cl has been introduced into the first cassette holder 60, so that the reel shafts 62 can be positioned at the position L1 in which an L-cassette Cl can be loaded.

In addition, rollers (not shown) are provided on the inner walls of the both side panels 16 so as to prevent the first cassette holder 6C from moving in a lateral direction when the first cassette holder 60 is moving in a horizontal direction along the horizontal portions of the guide grooves 16a, 16b and 16c.

Figure 10:
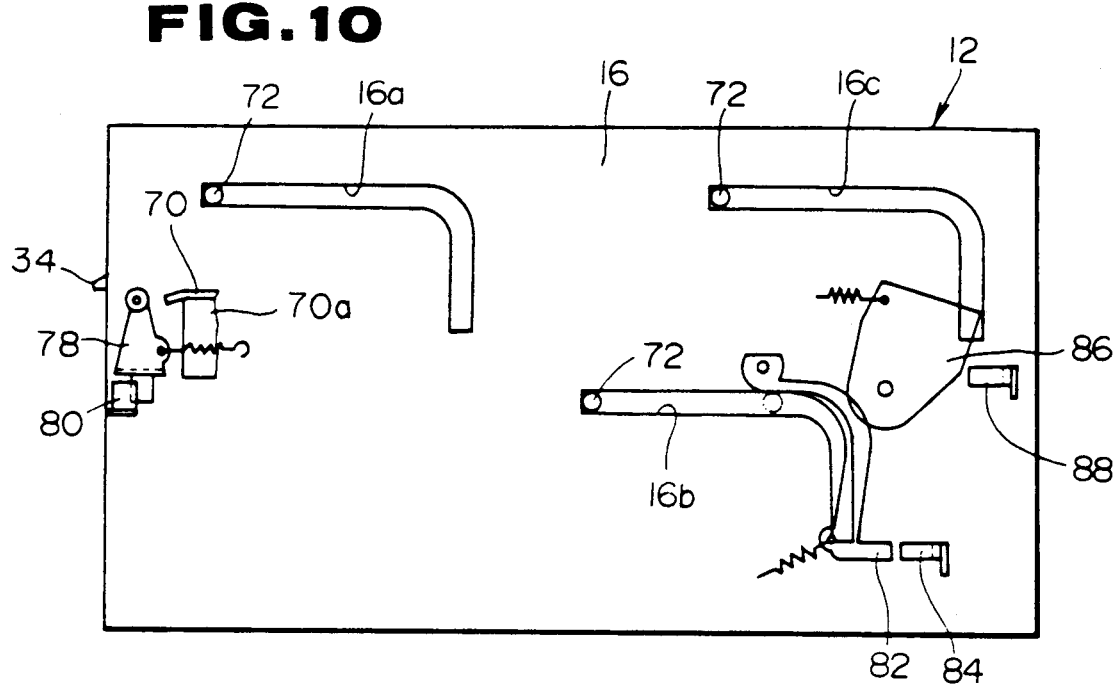
FIG. 10 is a schematic side view illustrating the cassette loading system of FIG. 1.

The other L-cassette pedestal 70, arranged at the right side in FIG. 9, has a rib 70a which projects downwards. As shown in FIGS. 9 and 10, a first detecting lever 78 and a first detecting switch 80 are provided on the inner wall of the right side panel 16 at the front portion thereof. The first detecting lever 78 can rotate as it comes into contact with the rib 70a of the L-cassette pedestal 70. Depending upon the rotation of the first detecting lever 78, the first detecting switch 80 can detect the position of the first cassette holder 60 in the horizontal direction. In addition, a second detecting lever 82 and a second detecting switch 84 are provided on the inner wall of the right side panel 16 near the guide groove 16b. The second detecting lever 82 rotates when the guide roller 72 reaches at the corner of the guide groove 16b. Depending upon the rotation of the second detecting lever 82, the second detecting switch 84 can detect the change in the moving direction of the first cassette holder 60 from horizontal to vertical and vice versa. Furthermore, a third detecting lever 86 and a third detecting switch 88 are provided on the inner wall of the right side panel 16 near the guide groove 16c. The third detecting lever 86 rotates when the guide roller 72 reaches at the lowest portion of the guide groove 16c. Depending upon the rotation of the third detecting lever 86, the third detecting switch 88 can detect that the first cassette holder 60 has reached the lowest portion of the guide groove 16c.

The first cassette holder 60 can move horizontally and vertically along the guide grooves 16a, 16b and 16c of the side panels 16, by means of a first cassette holder drive mechanism 90 which is arranged between the side panels 16 of the body 12 and the first cassette holder 60. The first cassette holder drive mechanism 90 comprises a pair of racks 92, a pair of pinions 94, a pair of first intermediate gears 96, a pair of second intermediate gears 98, a drive gear 100, first, second, and third gears 102, 104 and 106, a connecting shaft 108, a worm gear 110 and a drive motor 112. Each of the racks 92 is fixed to the inner wall of each of the outer panels 64 of the first cassette holder 60, and has an essentially serrated rack gear portion 92a arranged at the front and bottom surfaces thereof. The pair of pinions 94, the pairs of first and second intermediate gears 96 and 98 are pivotably supported on the inner walls of respective side panels 16, The drive gear 100, and the first gear 102, are pivotably supported on the inner walls of one of the side panels 16, while gears 104 and 106 are pivotably supported on the inner walls of the other. The pinions 94 are so arranged as to be engageable with the corresponding rack gear portions 92a of the racks 92. The drive gear 100 has inner and outer gear portions. The outer gear portion of the drive gear 100 engages the left-side pinion 94 via the corresponding first and second intermediate gears 96 and 98, and the inner gear portion thereof engages the worm gear 110 which is fixed to a rotating shaft 112a of the drive motor 112. The outer gear portion of the drive gear 100 also engages the first gear 102 which is connected to the second gear 104 by means of a connecting shaft 108. The second gear 104 engages the right-side pinion 94 via the third gear 106 and the corresponding first and second intermediate gears 96 and 98. The driving force, which is output from the drive motor 112 to the drive gear 100 via the worm gear 110, is transmitted to the left-side pinion 94 via the corresponding first and second intermediate gears 96 and 98, and to the right-side pinion 94 via the first gear 102, the connecting shaft 108, the second and third gears 104 and 106, and the corresponding first and second intermediate gears 94 and 96 In this way, the first cassette holder 60 can move along the L-shaped grooves 16a, 16b and 16c.

Structures of Second Cassette Holder and It Driving Mechanism

The second cassette holder 58 is designed to move horizontally in forward and rearward directions along guide grooves 64a which are formed in the outer panels 64 and extend in a horizontal direction. The second cassette holder 58 has an essentially rectangular body 114. The body 114 comprises a bottom plate 114a, a pair of side plates 114b which extend vertically from the both side edges of the bottom plate 114a, and a cassette keeping plate 114c which is arranged between the upper edges of the side plates 114b and which has a pair of rollers 116 for depressing a magnetic tape cassette C downwards. The bottom plate 114a of the second cassette holder body 114 is arranged at the essentially same height as that of the pair of L-cassette pedestals 68 and 70. In addition, the bottom plate 114a is provided with an end portion 114d which extends from the center of the bottom plate 114a in a forward direction. The end portion 114d is provided with a projecting guide rail 118 in order to prevent a cassette C from being introduced into the cassette holder assembly 24 in an incorrect manner, and to position a cassette C at a predetermined lateral position. The bottom plate 114a of the second cassette holder body 114 is also formed with an essentially rectangular through opening 114e at a location near the right-side L-cassette pedestal 68. A pivotable detecting lever 120 is so arranged as to project upwards through the opening 114e. When an M-cassette C2 is introduced into the second cassette holder 58, the detecting lever 120 rotates to cause a sensor 122 to determine that the M-cassette C2 has been introduced into the second cassette holder 58, so that the reel shafts 62 are caused to be positioned at the position L2 in which the M-cassette C2 can be loaded. In addition, a pair of long through openings 114f extending obliquely rearward are formed in the bottom plate 114a at the rear thereof, and a pair of levers 124 are pivotably supported on the lower surface of the bottom plate 114a. Each of the levers 124 has a pin 126 which projects upwards from a location near the top end of the lever 124 and which is so arranged as to extend through the corresponding through opening 114f. The right-side lever 124 is provided with a loading start switch 128 by which loading of the cassette C is started. The right-side lever 124 is cooperable with a cassette extruding mechanism (not shown) which is arranged between the first and second cassette holder 60 and 58, so as to cause the loading start switch 128 to be turned OFF when the cassette C is ejected. A pair of stoppers 114g are formed on the bottom plate 114a at the rear thereof by bending the bottom plate 114a. In addition, a pair of guide pins 130 are provided on the outer surface of each of the side plates 114b of the second cassette holder body 114, and extend outwards so as to be received into the corresponding guide grooves 64a formed in the outer panels 64 of the first cassette holder 60.

The second cassette holder 58 can move forwards and rearward in a horizontal direction along the guide grooves 64a of the first cassette holder 60, by means of a second cassette holder driving mechanism 140 which is arranged between the first and second cassette holders 60 and 58. The second cassette holder driving mechanism 140 comprises a pair of racks 142, a pair of pinions 144, a connecting shaft 146, a drive gear 148, first, second and third intermediate gears 150, 152 and 154, a worm gear 156 and a drive motor 158. Each of the racks 142 is fixed to the upper surfaces of the both side plates 114b of the second cassette holder 58. Both end portions of the connecting shaft 146 are pivotably supported on the upper portions of the pair of outer panels 64 of the first cassette holder 60. The pinions 144 are so arranged as to be engageable with the racks 142 and are fixed to the connecting shaft 146. The drive gear 148 is fixed to the connecting shaft 146 at the left-side end portion thereof. The first, second and third intermediate gears 150, 152 and 154 are pivotably supported on the left-side outer panel 64. The worm gear 156 is fixed to a rotating shaft 158a of the drive motor 158, and engages the drive gear 147 the first, second and third intermediate gears 150, 152 and 154. In this way, the second cassette holder 58 can move along the guide grooves 64a depending upon the rotation of the drive motor 158.

As can be seen clearly from FIG. 8 switches, a front detecting switch 160 for detecting a cassette C a rear detecting switch 162 for detecting a cassette C positioned at the fully inserted position, are arranged between the first and second cassette holders 60 and 58 at predetermined positions. FIG. 11 shows waveform characteristics of the sensors 76 and 122, the switches 80, 84, 88, 128, 160 and 162, and the drive motors 112 and 158 in a case where an M-cassette is introduced into the cassette holder assembly 24.

Structure of Front Lid Opening and Closing Mechanism

Figure 12:
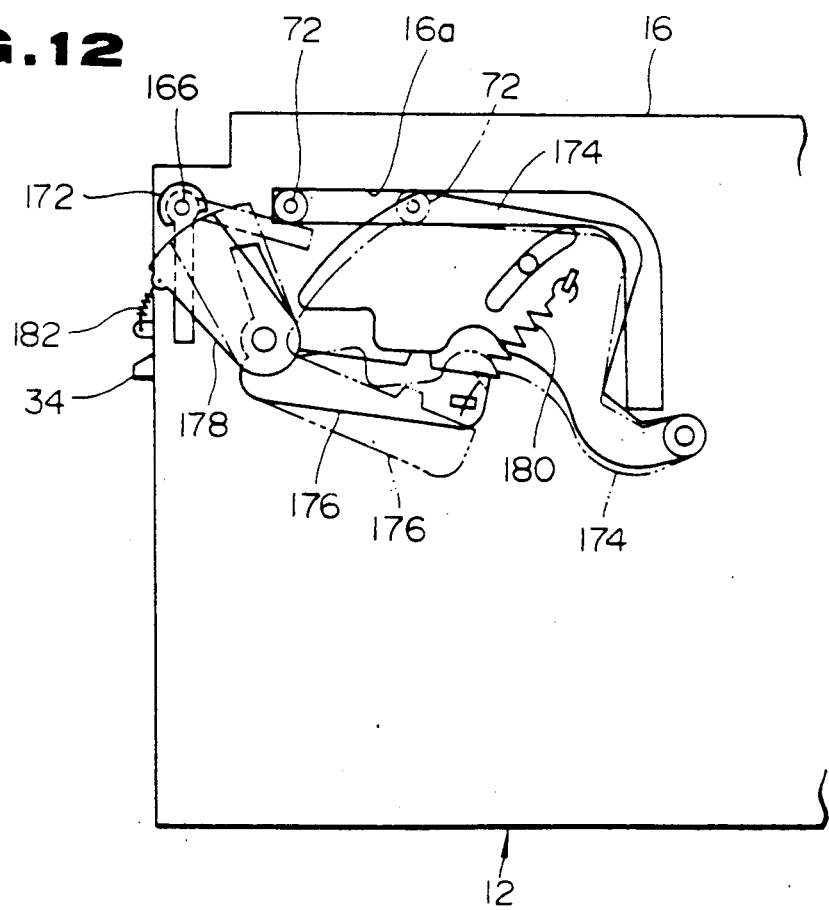
FIG. 12 is a schematic view illustrating a cassette inlet opening and closing mechanism.

As shown in FIGS. 9 and 12, the cassette inlet 22 is opened and closed by means of a lid member 164. The lid member 164 is fixed to a shaft 166 which is pivotably supported on the side panels 16 and which can rotate by means of a lid member opening and closing mechanism 170. The lid member opening and closing mechanism 170 comprises a gear 172, an actuating plate 174, a lever 176, a sector gear 178, and coil springs 180 and 182. The gear 172 is fixed to the shaft 166 at the right end thereof. The actuating plate 174 is pivotably supported on the inner wall of the right side plate 16 at a location near the guide groove 16a by means of a pin, and can rotate depending upon the movement of the guide roller 72. The lever 176 is designed to move upwards and downwards depending upon the rotation of the actuator plate 174. The sector gear 178 is pivotably supported on the top end of the lever 176, and engages the gear 172. The actuating plate 174 and the sector gear 178 are biased downwards by means of coil springs 180 and 182, respectively. When the guide rollers 72 move toward the corner of the guide grooves 16a by a slight distance, the actuating plate 174 moves downwards slightly so as to cause the lid member 164 to open. When the guide rollers 72 reach the corners of the guide grooves 16a, the lid member 164 begins to close.

Operation of Loading System

According to the magnetic tape cassette loading system of the present invention, first of all, a L-cassette C1 is inserted into the cassette inlet 22 of the body 12 in order to lead the L-cassette C1 on the pair of reel shafts 62. When the L-cassette C1 is inserted through the cassette inlet 22 into the first cassette holder 60, size of the cassette is determined by means of the sensor 76. On the basis of the determination with respect to the size of the cassette, the distance between the pair of reel shafts 62 is automatically adjusted so as to fit the size of the cassette C1. Then, the pair of pins 126 move toward the pair of stoppers 114g, and the loading start switch 128 becomes ON by means of the pin 126. When the loading start switch 128 becomes ON, each of the drive motors 112 and 158 rotates, for example, in the normal rotation direction of each rotating shaft 112a and 158a so that the horizontal or vertical movement of the first cassette holder 60, and the horizontal movement of the second cassette holder 58 are performed at the same time. Since the first and second cassette holders 60 and 58 move at the same time, the time spent on the movement of the cassette holder assembly 24 can be decreased compared with systems of the prior art, thus decreasing the time necessary for loading.

In addition, since the driving of the first and second cassette holders 60 and 58, and the adjustment of the distance between the pair of reel shafts 62 are performed at the same time, it is required that the first cassette holder 60 is moved downwards after the positions of the second cassette holder 58 and the pair of reel shafts 62 has been confirmed. This confirmation is performed by the second detecting switch 84. In this way, after the position of the pair of reel shafts 62 has been confirmed, the L-cassette C1 is loaded onto the pair of reel shafts 62.

The L-cassette C1 is unloaded by an operation inverse to the aforementioned operation. In this case, it must be prevented from completely ejecting the L-cassette C1 from the cassette inlet 22. To accomplish this, the first cassette holder is stopped when it passes the corners of the guide grooves 16a to reach to the horizontal portions therof, and, thereafter, only the second cassette holder 58 is moved in the ejecting direction.

M-cassettes C2 or S-cassettes C3 are loaded and unloaded in a similar manner. In a case where the S-cassette C3 is introduced into the cassette inlet 22, for example, even if a user tries to insert an S-cassette C3 through the cassette inlet 22 at a position other than the predetermined position, or to insert the latter obliquely, then, as shown in FIG. 4, the S-cassette C3 is prevented from being introduced into the cassette holder assembly 24 by means of one of the stopper members 38 and 40, since only one stopper member 38 or 40 swings downwards and the other stopper member 38 or 40 projects upwards when only one of the guide members 34 or 36 is depressed. In this way, it is possible to prevent an S-cassette C3 from being introduced into the cassette holder assembly 24 in an incorrect manner. As shown in FIG. 7, the projecting guide rail 118, which is formed on the bottom plate 114a of the second cassette holder 58 at the center thereof, engages a guide groove B formed in the bottom plate of the cassette C at the center thereof. In this way, it prevents a cassette C from being introduced into the cassette holder assembly 24, and it is possible to then correctly position the cassette C in the predetermined position. As a result, it is possible to surely position any cassette of the specified different sizes in the right loading position.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set out in the appended claims.

What is claimed is:

1. A cassette loading system for a recording and/or reproducing apparatus, comprising:
a loading system body defining a space; and
cassette holding means for receiving and holding a cassette therein, said cassette holding means including a first cassette holder means for moving within said space defined by the loading system body in horizontal and vertical directions respectively between an ejected position for a cassette and a loaded position, and a second cassette holder means for supporting said cassette therein and being supported on said first cassette holder for movement thereon in a horizontal direction, wherein said first cassette holder operates to move a cassette vertically between the loaded position and then horizontally to the ejected position in which said cassette can be removed, and said second cassette holder means moves relative to said first cassette holder means, said first and said second cassette holder means both moving from the position horizontally, said first cassette holder means moving vertically to the loaded position.

2. A cassette loading system as set forth in claim 1, which further comprises:
   first guiding means for guiding said first cassette holder in the vertical and horizontal movements thereof; and
   second guiding means for guiding said second cassette holder in the horizontal movements thereof.

3. A cassette loading system as set forth in claim 2, wherein said loading system body and said first cassette holder have respectively a pair of side walls facing each other and, said first guiding means comprises at, least one pair of L-shaped guide grooves formed in the loading system body, and at least one pair of rollers which are pivotably supported on the side walls of the first cassette holder and which are engageable with and movable along said L-shaped guide grooves.

4. A cassette loading system as set forth in claim 3, wherein said second guiding means comprises at least one pair of elongated grooves, each of which extends in a horizontal direction and is formed on a side wall of the first cassette holder, and at least one pair of rollers which are pivotably supported on the second cassette holder and which are engageable with and movable along the elongated grooves.

5. A cassette loading system as set forth in claim 1, wherein said cassette holding means can receive and hold one of a plurality of cassettes of different sizes therein.

6. A cassette loading system for a recording and/or reproducing apparatus, which system comprises:
   a loading system body defining a space;
   cassette holding means, arranged within the space defined by the loading system body, for receiving and holding therein one cassette of any of a plurality of different sizes; and
   cassette guiding means for guiding said cassette to said cassette holding means so as to position said cassette in said cassette holding means at a predetermined position adapted to each size of cassette, said cassette guiding means including stopper means for preventing said cassette from being received in said cassette holding means in a position other than said predetermined position, and from being obliquely introduced into said cassette holding means.

7. A cassette loading system as set forth in claim 6, wherein said cassette guiding means comprises a pair of guide members and a pair of stopper members, each of which is pivotably supported on a shaft fixed to said loading system body, said stopper members being associated with said guide members to allow said cassette to be received and held in said cassette holding means when said cassette to be introduced into said cassette holding means causes both of said guide members to rotate about said shaft.

8. A cassette loading system as set forth in claim 7, wherein said guide members are respectively arranged at right and left sides of said loading system body, and said stopper members are respectively arranged at right and left sides of said loading system, said stopper member arranged at the right side being connected to said guide member arranged at the left side so as to be rotatable depending upon the rotation of said guide member arranged at the left side, and said stopper member arranged at the left side being connected to said guide member arranged at the right side so as to be rotatable depending upon the rotation of said guide member arranged at the right side.

9. A cassette loading system for a recording and/or reproducing apparatus, said system having a loading system body defining a space, a cassette holding means for receiving and positioning one cassette of any of a plurality of different sized cassette within said space between a loaded position and an ejected position, said cassette holding means including cassette size sensing means for sensing the size of said one cassette, said system further comprising:
   cassette guiding means for guiding said cassette to said cassette holding means, said cassette guiding means including means for preventing said cassette from being received in said cassette holding mean sin a position other than a predetermined position for that particular size of cassette and means for preventing said cassette from being introduced obliquely into said cassette holding means.

10. A cassette loading system for a recording and/or reproducing apparatus, comprising:
   a loading system body defining a space; and
   cassette loading means for receiving and holding a cassette therein, said cassette holding means including a first cassette holder for movement in a horizontal direction from a cassette loading position to an intermediate position to a cassette vertical direction from said intermediate position to a cassette fully loaded position, and a second cassette holding means for supporting said cassette therein and being supported in said first cassette holder for movement therein in a horizontal direction, said first and said second cassette holders moving horizontally at the same time; and
   a first sensor means for sensing the presence of a said cassette in said first cassette holder to initiate said horizontal movement of said first cassette holder and a second sensor means for sensing the position of said second cassette holder to initiate vertically downward movement of said first cassette holder.

* * * * *